Figure 1:
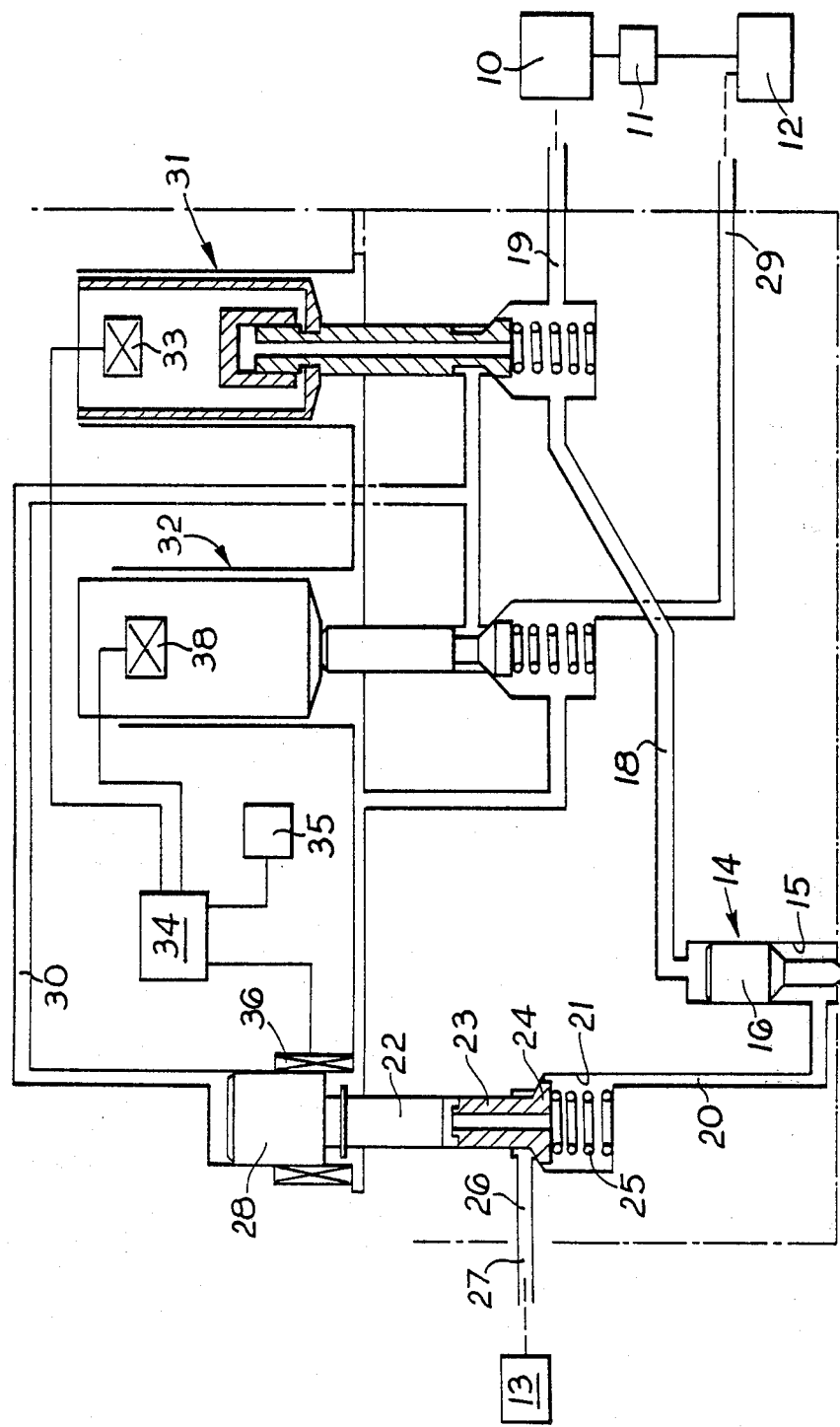

United States Patent [19]

Seilly

[11] 4,404,943
[45] Sep. 20, 1983

[54] FUEL SYSTEM FOR INTERNAL COMBUSTION ENGINES

[75] Inventor: Alec H. Seilly, North Wembley, England

[73] Assignee: Lucas Industries Limited, Birmingham, England

[21] Appl. No.: 325,775

[22] Filed: Nov. 30, 1981

[30] Foreign Application Priority Data

Jan. 27, 1981 [GB] United Kingdom ............... 8102388

[51] Int. Cl.³ ............................................. F02D 5/02
[52] U.S. Cl. .................................... 123/447; 123/458
[58] Field of Search ...................... 123/447, 357, 458

[56] References Cited

U.S. PATENT DOCUMENTS

| | | | |
|---|---|---|---|
| 3,730,159 | 5/1973 | Sallot | 123/447 |
| 3,827,409 | 8/1974 | O'Neill | 123/458 |
| 3,919,989 | 11/1975 | Jarrett et al. | 123/447 |
| 4,082,481 | 4/1978 | Fenne | 123/447 |
| 4,091,784 | 5/1978 | Seilly et al. | 123/447 |
| 4,173,208 | 11/1979 | Fenng et al. | 123/447 |
| 4,280,464 | 7/1981 | Kanai et al. | 123/447 |

*Primary Examiner*—Ira S. Lazarus
*Assistant Examiner*—Magdalen Moy

[57] ABSTRACT

A fuel system for an internal combustion engine includes a small accumulator in which fuel is stored, a fuel injection nozzle including an electrically operated means which controls fuel flow through the nozzle from the accumulator, and a transducer for providing a signal representing the accumulator pressure. An electrically operated valve is provided to control the flow of fuel from a pump to the accumulator and the system includes a control circuit for the valve. The control circuit is supplied with the signal provided by the transducer and also with a desired pressure signal which conveniently is obtained from a pressure map to which a signal representative of an engine operating parameter is supplied.

5 Claims, 5 Drawing Figures

FUEL SYSTEM FOR INTERNAL COMBUSTION ENGINES

This invention relates to a fuel system for supplying fuel to an internal combustion engine and of the kind comprising an accumulator in which fuel is stored at a high pressure, an injection nozzle which receives fuel from the accumulator, electrically operated means for opening a valve in the injection nozzle thereby to allow delivery of fuel to the engine and a pump for supplying fuel to the accumulator.

Such systems are known in the art, an example being illustrated in the specification of U.S. Pat. No. 4,091,784. The pressure of the fuel delivered to the engine is dependent upon the pressure of fuel in the accumulator and in some engine installations it is desirable to be able to vary the pressure at which fuel is supplied to the engine in accordance with the load on and the speed of the associated engine. Since the load on and the speed of the engine may vary very quickly, it is necessary to ensure that the pressure within the accumulator should also be able to vary quickly. In known systems accumulators have had two forms, the first being a vessel of substantial volume into which fuel is pumped, the compressibility of the fuel and the large volume of the vessel serving to prevent a substantial variation of pressure during the fuel delivery process and also in order to prevent undue fall of pressure due to the slow reaction of mechanical pressure governors.

The other type of accumulator has utilized gas under pressure to maintain the pressure of a volume of stored fuel. In this case whilst the volume of fuel is lower the volume of the gas at normal pressure is high. In both cases it is not easy to adjust the pressure quickly because of the volumes of the working fluids.

The object of the present invention is to provide a fuel system of the kind specified in a simple and convenient form.

According to the invention in a fuel system of the kind specified the accumulator has a low volume and there is provided a transducer for providing an electrical signal indicative of the pressure in the accumulator, electrically operated valve means for controlling the output of said pump, a control circuit for said valve means, said electrical signal forming a first signal to said control circuit and circuit means for providing a second input signal to said control circuit, said second input signal varying in accordance wth an operating parameter of the associated engine, said control circuit acting to control said valve means so that the pressure in said accumulator varies in accordance with said second input signal.

Figures 2, 3, 4:
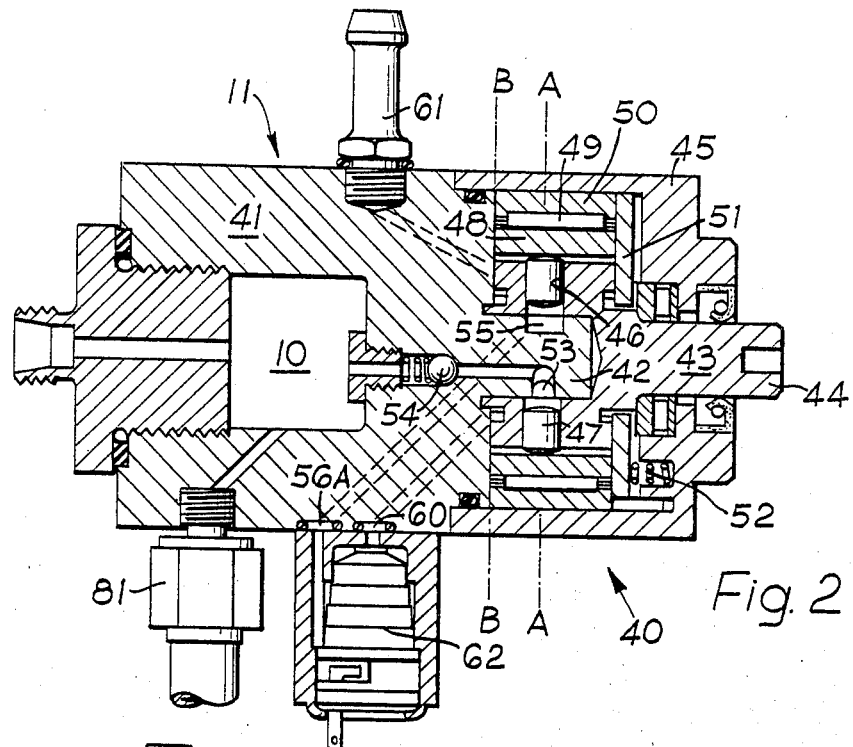
Figure 5:
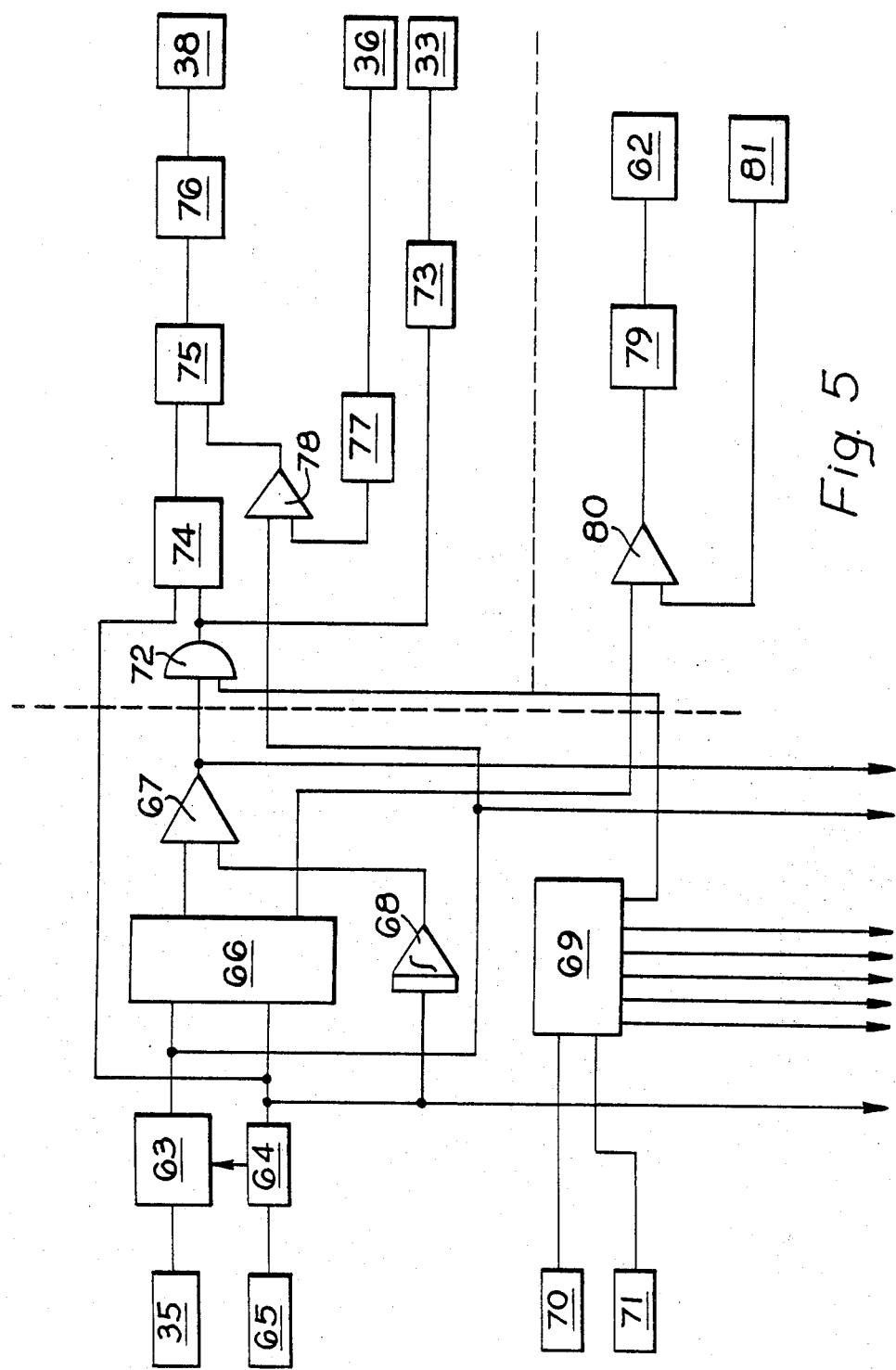

An example of a fuel control system in accordance with the invention will now be described with reference to the accompanying drawings in which:

FIG. 1 is a diagrammatic drawing showing the working components of a fuel injection nozzle and part of the associated fuel supply system, FIG. 2 is a sectional side elevation of the pump which supplies fuel under pressure to the accumulator, FIG. 3 is a section on the line AA of FIG. 2, FIG. 4 is a section on the line BB of FIG. 2 and FIG. 5 is a block diagram of the electrical control circuit.

With reference to FIG. 1 of the drawings, the pump injector illustrated therein is for supplying fuel to one cylinder of a compression ignition engine, it being appreciated that for a practical engine there are as many injectors of the type shown in FIG. 1 as there are engine cylinders. The common portion of the overall fuel system includes an accumulator 10 in which liquid fuel is stored at a high pressure, the fuel being supplied to the accumulator by means of a pump 11 from a source of fuel 12. Also provided and forming part of the common system is a low pressure fuel pump 13.

The individual fuel system includes a nozzle head diagrammatically illustrated at 14 and including a cylinder 15 in which is slidable a stepped valve member 16. The narrower end of the valve member is shaped for co-operation with a seating defined at one end of the cylinder thereby to control the flow of fuel through orifices 17 to a respective cylinder or combustion space of the engine with which the system is associated. Also provided is a first conduit 18 which communicates with an inlet 19 the latter being in constant communication with the accumulator. The conduit 18 communicates with the cylinder 15 at the end thereof remote from the seating so that the pressure of fuel within the accumulator is applied to the wider end of the valve member 16 thereby urging the valve member into contact with the seating. The other end of the cylinder communicates with a further conduit 20 which communicates with one end of a cylindrical chamber 21. The chamber 21 is of stepped form having a narrower portion intermediate its ends and in which is accommodated a slidable displacement piston 22. Also accommodated within the narrower portion of the chamber is the body of a valve element 23 having a head portion 24 which can be urged into contact with a seating defined in the wall of the chamber 21 by means of a coiled compression spring 25. The head of the valve element 23 is subjected to the pressure of fuel delivered by the pump 13 by way of a passage 26 communicating with a further inlet 27. The wider end of the chamber accomodates an operating piston 28 which contacts the displacement piston 22 and which has a larger area than the displacement piston 22. Conveniently, the area of the end surface of the operating piston is about twice that of the displacement piston. Moreover, the annular space surrounding the displacement piston and the wider end of the chamber 21 communicates with a drain outlet 29 which in use, is connected with a pipeline whereby any fuel flowing out of the outlet is returned to the supply tank 12.

The opposite end of the enlarged portion of the chamber 21 is connected to a supply conduit 30 and the supply conduit 30 can be placed in communication with the inlet 19 or with the outlet 29 by means of first and second solenoid operable valves 31, 32 respectively.

The valves include windings 33, 38 respectively which when energised, causes opening of the associated valve and the supply of electric current to the windings is controlled by a control circuit 34 which in addition receives a demand signal from a transducer 35 and also a signal from a winding 36 associated with the displacement and operating pistons 22, 28.

In the position shown, both valves are closed and the displacement piston 22 is spaced from the valve element 23. When the valve 31 is opened the supply conduit 30 is placed in communication with the inlet 19 and therefore fuel at accumulator pressure, acts upon the operating piston 28. This together with the displacement piston, moves downwardly as shown in the drawing and fuel is displaced to the conduit 20 by way of a passage extending between the ends of the valve element 23. Because of the differential areas of the operating piston and the displacement piston, the pressure of fuel in the conduit 20 is substantially higher than the accumulator pressure with the result that the valve member 16 is lifted from its seating so that flow of fuel can take place to the engine through the orifices 17. This flow of fuel continues until the displacement piston 22 contacts the valve element 23 thereby lifting the valve element from its seating and lowering the pressure in the conduit 20 to that existing at the inlet 27. As a result of the lowering of pressure in the conduit 20 the valve member 16 is urged onto its seating and flow of fuel to the engine ceases. The extent of movement of the displacement piston 22 is limited by a collar about its periphery.

The valve 31 is then closed and the valve 32 opened with the result that the supply conduit 30 is placed in communication with the drain outlet 29. When this communication is established the valve element 23 is held in the open position by the fuel pressure in the passage 26 and fuel at the low pressure existing in this passage flows into the chamber 21 and displaces the displacement piston 22 and the operating piston 28 in the upward direction as seen in FIG. 1. A signal indicating the extent of movement is provided by the winding 36 and this is passed to the control circuit 34. The control circuit 34 compares the signal produced by the winding 36 with the signal produced by the transducer 35 and when the appropriate amount of fuel has flowed into the chamber 21 the valve 32 is closed. Closure of the valve 32 creates an hydraulic lock in the passage 30 and movement of the pistons 22 and 28 is halted. The valve element 23 then closes onto its seating under the action of the spring 25 and the components of the system assume the positions shown in FIG. 1, with the pressure in the cylinder 15 being substantially equal to the pressure of fuel delivered by the source 13.

The accumulator 10 has a small volume in spite of the fact that it supplies fuel to all the pump/injectors of the fuel system and conveniently as shown in FIG. 2, it is formed in the housing of the pump.

Referring to FIGS. 2, 3 and 4, the pump comprises a multi-part body generally indicated at 40 and which includes a first portion 41 formed with a cylindrical port block 32 extending beyond one face thereof.

Surrounding the port block is a cup shaped rotor 43, the rotor being provided with an axially extending cylindrical cavity. Moreover, the rotor has an extension 44 which extends to the exterior of the body, the extension being supported by means of bearings in the base wall of a cup shaped portion 45 of the body, the cup shaped portion being engaged about a reduced portion of the part 41 of the body.

The rotor 43 is provided with, in the particular example, four radially extending equiangularly spaced bores 46 in which are located plungers 47 respectively. The peripheral surface of the rotor is of cylindrical form and the rotor is surrounded in spaced relationship, by an annular ring member 48 the internal peripheral surface of which is engaged by the outer ends of the plungers. The ring member 48 is supported on rollers 49 only a few of which are shown, within a further ring member 50 which is fixed within the cup shaped portion 45 of the body. The ring members 48 and 50 together with the rotor, are biassed towards the end face of the body portion 41 by means of a slide plate 51 which engages the ring members and the rotor, the side plate being biassed by compression springs 52 located in suitable recesses in the cup shaped portion of the body.

The axis of the internal surface of the ring member 50 is eccentrically disposed relative to the axis of rotation of the rotor and so also therefore is the internal surface of the ring 48.

The block 42 has a pair of ports defined in its peripheral surface, one of these referenced 53, constitutes the outlet port for the pump constituted by the plungers, and is connected to the accumulator 10 by way of non-return valves 54. The other port referenced 55, constitutes the inlet for the plunger pump and it is connected to a recess 56A on the periphery of the body portion 41. The rotor rotates in the clockwise direction as seen in FIG. 3 and the centre of the internal surface of the ring 50 is off-set towards the right relative to the axis of rotation of the rotor again as seen in FIG. 3. As a result when the inner ends of the bores 46 are brought into communication with the port 55, fuel under pressure, as will be explained, is supplied to the inner end of the bore to effect outward movement of the plunger. This movement continues through substantially 180° and during continued rotation the plungers then start to move inwardly during which time the inner ends of the bore communicate with the outlet groove 53. As a result fuel is displaced by way of the non-return valve 54 to the accumulator.

Alternately disposed relative to the bores 46, are radially disposed slots 56 having blind ends spaced outwardly from the internal peripheral surface of the rotor. The slots extend to the periphery of the rotor and mount vanes 57 respectively. Moreover, formed in the end surface of the body portion 41 which is engaged by the rings 48, 50 and the rotor, is a pair of arcuate ports 58, 59. Port 58 constitutes the inlet port for the vane pump constituted by the vanes and it is connected to a fuel inlet 61 on the exterior of the body. Port 59 constitutes the outlet port for the vane pump and it is connected to a recess 60 formed adjacent to the recess 56A. Assuming for the moment that the two recesses 56A and 60 are placed in communication with each other, then as the rotor rotates the vanes act as a pump to draw fuel from the inlet 61 and to displace it to the inlet port 55 of the plunger pump. It is arranged that the displacement of the vane pump is greater than the displacement of the plunger pump and the output pressure of the vane pump is controlled by the action of the springs 52 which bias the plate 51. In the event that the pressure rises above a pre-determined value, then the plate 51 will be displaced axially against the action of the springs 52 and the output pressure of the vane pump will be controlled.

The amount of fuel at high pressure which flows to the accumulator 10 is controlled by a valve generally indicated at 62 and which controls the communication between the recesses 56A and 60. The valve is electromagnetically controlled. The pressure within the accumulator 10 can be controlled by varying the current flowing in the winding of the valve actuator.

With reference to FIG. 5 there is provided a governor circuit 63 the output signal from which is a required fuel signal. In order for the governor circuit to determine this signal it is provided with a demanded fuel signal from the transducer 35 which is associated with the throttle pedal of the vehicle, and a speed signal from a decoding circuit 64 which is supplied with a signal from a transducer 65 which is associated with a rotary part of the engine.

The required fuel signal and also a speed signal from the decoder, are supplied to a circuit 66 which determines the desired timing of delivery of fuel to the associated engine. The circuit 66 is divided into three parts, one of which is responsible for determining the timing as the required quantity of fuel is varied, the second part being responsible for providing variation of the timing of delivery of fuel in accordance with the engine speed, and the third being a reference which provides for the static timing of the delivery of fuel. The output signal from the circuit 66 is applied to a comparator 67.

A further input to the comparator 67 is provided by an integrating circuit 68 which receives the engine speed signal from the decoder 64. An engine position determining circuit 69 is provided which is supplied with signals by a pair of transducers 70, 71, the transducer 70 providing signals at each revolution of the engine, equal to half the number of engine cylinders (six in the example) and the transducer 71 providing a signal once per two revolutions of the engine. The circuit 69 has six outputs, one for each engine cylinder. The signal provided by the comparator is supplied to an AND gate 72 along wih a signal from the respective output of the circuit 69 such that the signal from the AND gate appears at the time required for delivery of fuel. This takes into account the variation in timing required for different engine speeds and loads.

The output of the AND gate 72 is supplied to a drive circuit 73 which supplies power to the winding 33 of the injector. The winding 33 remains energised until the signal from the AND gate ceases.

The signal from the AND gate 72 is also supplied to a pulse delay circuit 74 which also receives a speed signal from the decode circuit 64. The action of the delay circuit is to delay the pulse provided by the AND gate until sufficient time has lapsed for delivery of fuel to take place. The output of the other delay circuit 74 is supplied to one input of a monostable circuit 75 which when a signal is received from the delay circuit, energises a drive circuit 76 which supplies current to the winding 38. The valve 32 is therefore opened to allow fuel to flow from the source 13. The transducer 36 provides a signal by way of a converter circuit 77 to one input of a fuel comparator 78. The comparator receives a second input signal from the governor circuit 63 and when the signal from the transducer indicates that the required amount of fuel has been supplied from the source 13, the comparator provides a stop signal to the monostable circuit 75 which switches to halt the supply of electric current to the winding 38.

The circuit 69 supplies signals to remaining circuits individual to the other injection nozzles and in addition the speed, fuel and timing signals are supplied to the remaining circuits.

In FIG. 5 the valve 62 is shown and current is supplied to the valve by a power circuit 79 which is controlled by a comparator 80. The comparator receives a first signal from a pressure transducer 81 which provides a signal indicative of the pressure in the accumulator 10. The other input signal to the comparator 80 is supplied by the circuit 66. This signal represents the desired accumulator pressure and the circuit 66 varies this signal in accordance with the speed and load, the load signal being represented by the desired fuel signal provided by the governor circuit 63. The circuit 66 is a timing map and a pressure map and it contains stored information appropriate to the particular engine to be supplied with fuel by the fuel system.

In a particular example, the maximum volume of fuel required to be delivered is 40mm 3 per injection of fuel to the engine and the drop in the accumulator pressure from an initial value of 500 ATS about 10%. On this basis and assuming 0.7% compression of the fuel per 100 ATS, the volume of the accumulator is about 12 cc. The system shown in FIG. 1 does require a larger volume of fuel to be stored because of the increased area of the piston 28 as compared with the piston 22. If the area of the piston 28 is twice the area of the piston 22 then the volume of the accumulator must be increased by a factor of 2. Moreover, it is necessary to allow an additional amount to allow for spillage of fuel at the end of fuel delivery. The fact that the accumulator 10 has a small volume means that its pressure can be altered quickly by operation of the valve 62 thus enabling the pressure at which fuel is supplied to the nozzles to vary quickly. For a high speed engine and particularly one with more than four cylinders whilst in theory the volume of the accumulator need not be increased it may in fact be necessary to provide more than one accumulator each accumulator serving a number of injection nozzles. This is to allow sufficient time for shock waves to die away. If desired a switch circuit may be provided between the comparator 80 and the power circuit 79 to prevent variation in the accumulator pressure whilst delivery of fuel is taking place.

I claim:

1. A fuel for supplying fuel to an internal combustion engine, comprising an accumulator in which fuel is stored at a high pressure, an injection nozzle which receives fuel from the accumulator, electrically operated means for opening a valve in the injector nozzle, thereby to allow delivery of fuel to the engine, a pump for supplying fuel to the accumulator, characterized in that the accumulator has a small volume, and by a transducer for providing an electrical signal indicative of the pressure within the accumulator, electrically operated valve means for controlling the output of said pump, a control circuit for said valve means, said electrical signal forming a first input signal to said control circuit, circuit means for providing a second input signal to said control circuit, said second input signal varying in accordance with an operating parameter of the associated engine, said control circuit acting to control said valve means so that the pressure in said accumulator varies in accordance with said second input signal, and said pump comprising a high pressure pump and a low pressure pump, said valve means acting to control the flow of fuel from said low pressure pump to said high pressure pump.

2. A fuel system according to claim 1 in which said accumulator has a volume of approximately 12.0 cubic centimeters assuming a fuel delivery of 40.0 cubic millimeters and a 10% drop in the accumulator pressure from 500 ATS with 0.7% compression of the fuel per 100 ATS.

3. A fuel system according to claim 1 or claim 2 in which said circuit means includes a pressure map containing stored information regarding the desired accumulator pressures for a range of values of the engine operating parameters.

4. A fuel system according to claim 3 in which said engine operating parameter is the engine speed, the circuit means also being responsive to the amount of fuel being supplied to the engine.

5. A fuel system according to claim 4 in which said control circuit includes a comparator to which said first and second input signals are supplied.

* * * * *